United States Patent
Tabayashi et al.

(10) Patent No.: US 9,683,115 B2
(45) Date of Patent: Jun. 20, 2017

(54) INK COMPOSITION

(71) Applicant: MIMAKI ENGINEERING CO., LTD., Nagano (JP)

(72) Inventors: Isao Tabayashi, Nagano (JP); Jun Nakamura, Nagano (JP); Takeyuki Sakurai, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 23 days.

(21) Appl. No.: 14/437,497

(22) PCT Filed: Oct. 30, 2013

(86) PCT No.: PCT/JP2013/079413
§ 371 (c)(1),
(2) Date: Apr. 21, 2015

(87) PCT Pub. No.: WO2014/073431
PCT Pub. Date: May 15, 2014

(65) Prior Publication Data
US 2015/0240091 A1    Aug. 27, 2015

(30) Foreign Application Priority Data

Nov. 7, 2012  (JP) .................................. 2012-245760

(51) Int. Cl.
*C09D 11/033* (2014.01)
*C09D 11/328* (2014.01)
*C09D 11/38* (2014.01)

(52) U.S. Cl.
CPC .......... *C09D 11/033* (2013.01); *C09D 11/328* (2013.01); *C09D 11/38* (2013.01)

(58) Field of Classification Search
CPC ...... C09D 11/033; C09D 11/328; C09D 11/38
USPC .......................................... 106/31.43, 31.58
See application file for complete search history.

(56) References Cited

U.S. PATENT DOCUMENTS

| 4,610,554 | A  | * | 9/1986  | Suzuki .................. | C09D 11/02 106/31.43 |
| 6,214,963 | B1 |   | 4/2001  | Noguchi et al. | |
| 7,901,495 | B2 | * | 3/2011  | Shikata ................. | C09D 11/38 106/31.43 |
| 2002/0158952 | A1 | * | 10/2002 | Adachi ................. | C09D 11/38 347/100 |
| 2005/0076806 | A1 | * | 4/2005  | Hanmura ............. | C09D 11/328 106/31.58 |
| 2007/0030324 | A1 |   | 2/2007  | Chevli | |
| 2011/0292114 | A1 | * | 12/2011 | Sao ...................... | C09D 11/328 106/31.58 |
| 2012/0176455 | A1 |   | 7/2012  | Ohta et al. | |

FOREIGN PATENT DOCUMENTS

| EP | 0835890 | 4/1998 |
| EP | 2390288 | 11/2011 |
| JP | 10-168151 | 6/1998 |
| JP | 2005-263882 | 9/2005 |
| JP | 2007-238949 | 9/2007 |
| JP | 2011-012226 | 1/2011 |

OTHER PUBLICATIONS

English translation of JP 2007/238949, Sep. 2007; 12 pages.*
"The Extended European Search Report of European Counterpart Application", issued on Jun. 22, 2015, pp. 1-4.
"First Office Action of China Counterpart Application", issued on Nov. 4, 2015, pp. 1-12, with English translation thereof.
"International Search Report (Form PCT/ISA/210)", mailed on Dec. 3, 2013, with English translation thereof, pp. 1-2, in which three of the listed references (JP10-168151A, JP2007-238949A, and JP2005-263882A).
"Office Action of European Counterpart Application", issued on May 2, 2016, p. 1.
"Office Action of Japan Counterpart Application" with English translation, issued on Jul. 12, 2016, p. 1-p. 5.
"Office Action of China Counterpart Application," issued on Sep. 14, 2016, with English translation thereof, p. 1- p. 9.

* cited by examiner

*Primary Examiner* — Helene Klemanski
(74) *Attorney, Agent, or Firm* — Jianq Chyun IP Office

(57) ABSTRACT

An ink composition is provided and attains a more stable dischargeability without adversely affecting the drying property of a print object. As the solution, the ink composition contains water, a disperse dye, glycols, and an alcoholamine.

7 Claims, No Drawings

INK COMPOSITION

CROSS-REFERENCE TO RELATED APPLICATION

This application is a 371 application of an international PCT application serial no. PCT/JP2013/079413, filed on Oct. 30, 2013, which claims the priority benefit of Japan application no. JP 2012-245760, filed on Nov. 7, 2012. The entirety of each of the above-mentioned patent applications is hereby incorporated by reference herein and made a part of this specification.

TECHNICAL FIELD

The invention relates to alcoholamine-containing ink compositions.

BACKGROUND ART

The patent document 1 describes an inkjet recording ink composition containing an aqueous emulsion resin and a pigment blended therein, wherein an aminoethanol is further added as a dispersion stabilizer. This inkjet recording ink composition is directed at controlling aggregation and fusion of the emulsion resin.

PRIOR ART DOCUMENT

Patent Document

Patent Document 1: JP 2011-12226 A (disclosed on Jan. 20, 2011).

SUMMARY OF THE INVENTION

Problems to be Solved by the Invention

With disperse dye-containing inks, particularly black inks obtained by mixing two or more differently colored disperse dyes, the disperse dyes are likely to aggregate, thus clogging nozzles. This is a drawback against a stable ink dischargeability.

Increasing the content of glycols in ink lessens the possibility of drying of the ink to be discharged through the nozzles, thus improving the discharge stability of the ink. However, this raises another problem that the drying property of a print object printed with the discharged ink may be adversely affected.

The invention was accomplished to solve these problems. The invention has an object to provide an ink composition that attains a more stable dischargeability without adversely affecting the drying property of a print object.

Solutions to the Problems

To solve the problems, the invention provides an ink composition containing water, a disperse dye, glycols, and an alcoholamine.

The glycols such as glycerin are added to the ink composition as a humectant, serving not to dry the ink composition. The alcoholamine serves to control aggregation of the disperse dye contained in the ink composition, thus improving the discharge stability of the ink composition.

In the ink composition of this invention containing the alcoholamine as well as glycols, the content of glycols is lower than in other inks containing the glycols alone. This prevents the drying property of a print object printed with this ink composition from decreasing to an unacceptable level.

Preferably, the ink composition according to the invention contains a plurality of the disperse dyes blended therein.

Combining a plurality of disperse dyes involves the risk that the disperse dye aggregation becomes more aggressive than using just one disperse dye. On the other hand, the ink composition according to the invention containing the alcoholamine can control the disperse dye aggregation, attaining a more stable dischargeability.

More preferably, the ink composition according to the invention contains a plurality of the disperse dyes blended therein to constitute a black ink.

Combining a plurality of disperse dyes to obtain a black ink involves the risk that the disperse dye aggregation becomes more aggressive than using just one disperse dye. On the other hand, the ink composition according to the invention containing the alcoholamine can control the disperse dye aggregation, attaining a more stable dischargeability.

In the ink composition according to the invention, the alcoholamine is preferably a methyldiethanolamine.

The methyldiethanolamine has a greater effect to control the disperse dye aggregation than other alcoholamines, thus allowing the disperse dye aggregation to be optimally controlled.

The ink composition according to the invention preferably contains the alcoholamine in a content equal to or greater than 0.01 wt. % and equal to or less than 1 wt. %.

The alcoholamine content equal to or greater than 0.01 wt. % allows the disperse dye aggregation to be effectively controlled. On the other hand, the alcoholamine content equal to or less than 1 wt. % ensures a long storage stability of the ink composition with no variation in its property.

Effects of the Invention

The ink composition according to the invention attains a more stable dischargeability without adversely affecting the drying property of a print object.

EMBODIMENT OF THE INVENTION

An embodiment of the invention is hereinafter described in detail.

<Ink Composition>

An ink composition according to the invention contains water, a disperse dye, glycols, and an alcoholamine. The ink composition (ink) is discharged onto a print object through a head of an inkjet printer to form an image.

<Water>

The ink composition according to the invention contains water. The water content may be optimally decided depending on applications of the the ink composition. For example, the water content is preferably equal to or greater than 20 wt. %, and more preferably equal to or less than 80 wt. % in the whole quantity of the ink composition.

<Disperse Dye>

The ink composition according to the invention contains a disperse dye. The disperse dye is a material sublimated by heating. The disperse dye is hardly dissolved to remain dispersed in a solvent such as water.

The disperse dye to be added may be optimally decided depending on applications of the ink composition. Examples of the disperse dye are: C.I. disperse yellow—3:1, 23, 42, 54, 64, 82, 114, 119, 163, and 211; C.I. disperse orange 13, 25, 29, 30, 31, 42, 44, 44:1, 45, 61, 61:1, 62, 73, 76, and 288; C.I. disperse red 13, 17, 50, 54, 60, 73, 74, 82, 118, 135, 145, 152, 153, 167, 177, 205, 278, 311, and 343; C.I. disperse blue 60, 73, 102, 148, 149, 165, 165:1, 183:1, 257, 281, 284, 291:1, 301, 321, 354, 359, 366, and 367; C.I. disperse brown 1, 1:1, 19, and 19:1; and C.I. disperse green 9. Any suitable fluid dispersion commercially available may be used to prepare the disperse dye. Examples of the fluid dispersion are, Hymicron K yellow-A1013, Hymicron K red-A1115, and Hymicron K blue-A1119 supplied by MIKUNI COLOR LTD. The fluid dispersion used to prepare the disperse dye may be obtained by conventional techniques.

The disperse dye content may be optimally decided depending on applications of the ink composition. For example, the disperse dye content in the ink composition is preferably equal to or greater than 0.5 wt. % and equal to or less than 10 wt. %, and more preferably equal to or greater than 1 wt. % and equal to or less than 8 wt. %.

The ink composition according to the invention may contain a plurality of the disperse dyes blended therein. For example, the ink composition according to the invention may contain a plurality of the disperse dyes that are differently colored and blended therein to constitute a black ink.

Conventionally, combining a plurality of disperse dyes leads to an increased risk of the disperse dye aggregation compared to using just one disperse dye. But, the ink composition containing alcoholamine, as described later, can control aggregation of the plurality of disperse dye, thus attaining a more stable dischargeability.

<Glycols>

The ink composition according to the invention contains glycols. The glycols are added to the ink composition as a humectant, serving not to dry the ink composition.

The glycols described in this description refer to aliphatic compounds in which two or more hydroxyl groups are respectively bonded to different carbon atoms. Examples of the glycols are glycol ethers including: monoether derivatives of glycerin, trimethylolpropane, ethylene glycol, diethylene glycol, triethylene glycol, propylene glycol, dipropylene glycol, tripropylene glycol, and ethylene glycol; monoether derivatives of diethyleneglycol; and monoether derivatives of triethyleneglycol; 1,3-butanediol, 2,3-butanediol, 1,4-butanediol, 3-methyl-1,3-butanediol, 1,5-pentanediol, 1,6-hexanediol, and 2-methyl-2,4-hexanediol. The glycols may be one selected from these examples, or more than one of them may be selected and mixed.

The glycols content in the ink composition may be optimally decided depending on applications of the ink composition. For example, the glycols content in the ink composition is preferably equal to or greater than 10 wt. %, and more preferably equal to or less than 30 wt. %. The glycols content equal to or greater than 10 wt. % effectively prevents the ink from drying, thus ensuring that the ink attains a more stable dischargeability. The glycols content equal to or less than 30 wt. % prevents the drying property of the ink on a print object from decreasing more than necessary.

<Alcoholamine>

The ink composition according to the invention contains an alcoholamine. The ink composition containing the alcoholamine attains a more stable dischargeability without adversely affecting the drying property of a print object.

Conventionally, the quantity of glycols to be added to the ink composition containing the disperse dye is suitably adjusted to improve the discharge stability and also to reduce the likelihood to dry the ink. Increases of the content of glycols to improve the discharge stability, however, may make the ink on a print object too difficult to dry.

On the other hand, the ink composition of this invention containing the alcoholamine can control aggregation of the disperse dye. This prevents over a long period of time such an unfavorable event that nozzles are clogged with the aggregated disperse dye. As a result, the ink can attain a more stable dischargeability without unnecessary increases of the glycols to be added.

The alcoholamine to be added may be optimally decided depending on applications of the ink composition. Examples of the alcoholamine are: alkanolamines such as methanolamine, ethanolamine, propanolamine, and butanolamine; aromatic aminoalcohols; and primary, secondary, and tertiary alcohols. Any one selected from these examples is usable with no particular preference. The alcoholamine is more specifically, for example, monoethanolamine, diethanolamine, triethanolamine, ethyldiethanolamine, diethylethanolamine, tripropanolamine, 2-amino-2-methyl-1-propanol, methylethanolamine, methyldiethanolamine, dimethylethanolamine, ethylethanolamine, dibutylethanolamine, diisopropanolamine, or trimethylethanolamine. Of these examples, methyldiethanolamine (hereinafter, referred to as "MDA") is particularly preferable.

Adding the alcoholamine to the ink composition effectively controls aggregation of the disperse dye. The MDA, in particular, has a greater effect to control the disperse dye aggregation than other alcoholamines, thus optimally controlling the disperse dye aggregation.

The alcoholamine content in the ink composition may be optimally decided depending on applications of the ink composition. For example, the alcoholamine content in the ink composition is preferably equal to or greater than 0.01 wt. % and equal to or less than 1 wt. %, more preferably equal to or greater than 0.05 wt. % and equal to or less than 0.5 wt. %, and even more preferably equal to or greater than 0.1 wt. % and equal to or less than 0.3 wt. %. The alcoholamine content equal to or greater than 0.01 wt. % allows the disperse dye aggregation to be effectively controlled. With the alcoholamine content equal to or less than 1 wt. %, the pH value of the ink composition can be adjusted to stay in a range of values that does not adversely affect the head. This ensures a long storage stability of the ink composition with no variation in its property.

<Disperser>

A disperser may be further added to the ink composition according to the invention as a dispersion accelerator for the disperse dye.

The disperser to be added may be decided depending on applications of the ink. Examples of the disperser are SOLSPERSE 43000, SOLSPERSE 44000, Disperbyk-190, Disperbyk-194, and Disperbyk-2015.

The disperser content may be optimally decided depending on applications of the ink composition and type of the disperse dye to be used. For example, the disperser content in the ink composition is preferably equal to or greater than 10 wt. % and equal to or less than 25 wt. %.

<Other Ingredients>

The ink composition according to the invention may further contain other suitable ingredients. For example, the ink composition according to the invention may further contain, for example, an antiseptic agent, an antifungal agent, and/or a regulator of surface tension, each in such a quantity that does not undermine the discharge stability and the storage stability of the ink composition.

The embodiment of the invention is hereinafter described in further detail referring to examples. Needless to say, the invention is not limited to the examples described below, and details of the invention may be variously modified. The invention is not necessarily limited to the embodiment described so far and may be carried out in many other forms. The technical scope of the invention encompasses any modifications within the scope of the invention defined by the appended claims and embodiments obtained by variously combining the technical means disclosed herein. The contents of the cited document set forth in this description are all incorporated herein by reference.

EXAMPLES

<Preparation of Ink Compositions>

An ink composition to be presented as an example 1 was prepared by mixing the following materials. Of 100 wt. % of the ink composition in total, ratios of the respective materials were: 22.11 wt. % of water; 9.44 wt. % of Hymicron K yellow-A1013 (sublimation dye dispersion supplied by MIKUNI COLOR LTD.); 9.30 wt. % of Hymicron K red-A1115 (sublimation dye dispersion supplied by MIKUNI COLOR LTD.); 37.60 wt. % of Hymicron K blue-A1119 (sublimation dye dispersion supplied by MIKUNI COLOR LTD.); 14.90 wt. % of propylene glycol; 5 wt. % of 1,3-butyleneglycol; 0.01 wt. % of MDA; 1.50 wt. % of Surfynol 465; and 0.1 wt. % of Proxel XL2.

Refer to Table 2 for materials of ink compositions presented as examples 2 to 5. Surfynol 465 is a surfactant, and Proxel XL2 is an antiseptic agent.

For comparative examples, fluid dispersions to be added to the ink composition were prepared. Of 100 wt. % of a fluid dispersion in total, ratios of the respective materials were: 22.5 wt. % of yellow 54; 10 wt. % of SOLSPERSE 43000; 10 wt. % of SOLSPERSE 44000; 4.5 wt. % of propylene glycol, and 0.1 wt. % of Proxel XL2. The resulting mixture was pulverized for 24 hours by a bead mill into fine particles to prepare a fluid dispersion 1 (zirconia bead of 0.3 mm in diameter was used).

Refer to Table 1 for materials of fluid dispersions 2 to 4. The products shown in Table 1, SOLSPERSE 43000, SOLSPERSE 44000, and Disperbyk-190, are dispersers added to the ink compositions.

TABLE 1

|  | Fluid dispersion 1 | Fluid dispersion 2 | Fluid dispersion 3 | Fluid dispersion 4 |
|---|---|---|---|---|
| Blue 60 | — | — | — | — |
| Red 60 | — | 22.5% | — | — |
| Yellow 54 | 22.5% | — | — | — |
| Blue 359 | — | — | 15.0% | — |
| Blue 72 | — | — | — | 22.5% |
| SOLSPERSE 43000 | 10.0% | 12.5% | — | 10.0% |
| SOLSPERSE 44000 | 10.0% | 12.5% | — | 10.0% |
| Disperbyk-190 | — | — | 20.0% | — |
| Propylene glycol | 4.5% | 4.5% | 4.5% | 4.5% |
| Water | 52.9% | 47.9% | 60.4% | 52.9% |
| Proxel XL2 | 0.1% | 0.1% | 0.1% | 0.1% |
| Total | 100% | 100% | 100% | 100% |

Next, ink compositions of comparative examples 1 and 2 were prepared by using the fluid dispersions 1 to 4. Refer to Table 2 for materials of the ink compositions prepared as the comparative examples.

<Ink Composition Evaluation>

The ink compositions of the examples and comparative examples were evaluated in terms of storage stability, pH value, and discharge stability (continuous discharge stability).

The storage stability evaluation was based on changes, in contrast to the ink compositions just prepared, in degrees of viscosity and particle sizes of the ink compositions measured at 60° C., 24 hours later. In this table, the symbols are used as follows: circle for the ink compositions with rates of change of 10% or less from their initial values, triangle for greater than 10% to 15%, and cross for greater than 15% to 20%.

The pH values obtained from the ink compositions just prepared were evaluated. In this table, the symbols are used as follows: circle for the ink compositions with the pH values less than 9, triangle for 9 to less than 10, and cross for 10 or more. The ink compositions with smaller pH values have less adverse impacts on the nozzles.

The discharge stability was evaluated by determining how much of each prepared ink composition was continuously dischargeable through the nozzles by the time when the dischargeability was compromised. In this table, the symbols are used as follows: circle for the ink compositions with continuously dischargeable quantities of 10 m² or more, triangle for 5 m² to less than 10 m², and cross for less than 5 m².

[Result]

Table 2 shows the evaluation result of the ink compositions prepared as the examples and comparative examples.

TABLE 2

|  |  | Comparative example 1 | Comparative example 2 | Example 1 | Example 2 | Example 3 | Example 4 | Example 5 |
|---|---|---|---|---|---|---|---|---|
| Pure water |  | 40.40% | 22.20% | 22.11% | 22.11% | 22.10% | 22.10% | 22.10% |
| Disperser | Sb-D-R 60 | 7.60% | — | — | — | — | — | — |
|  | Sb-D-Y 54 | 3.90% | — | — | — | — | — | — |
|  | Sb-D-B 1359 | 9.70% | — | — | — | — | — | — |
|  | Sb-D-B 172 | 11.30% | — | — | — | — | — | — |

TABLE 2-continued

| | | Comparative example 1 | Comparative example 2 | Example 1 | Example 2 | Example 3 | Example 4 | Example 5 |
|---|---|---|---|---|---|---|---|---|
| | Hymicron K yellow-A 1013 | — | 9.40% | 9.44% | 9.44% | 9.40% | 9.40% | 9.40% |
| | Hymicron K red-A 1115 | — | 9.30% | 9.30% | 9.30% | 9.30% | 9.30% | 9.30% |
| | Hymicron K blue-A 1119 | — | 37.60% | 37.60% | 37.60% | 37.60% | 37.60% | 37.60% |
| | glycerin | 10.00% | | | | | | |
| | propylene glycol | 15.50% | 14.90% | 14.90% | 14.90% | 14.90% | 14.50% | 14.00% |
| | 1,3-butylene glycol | — | 5.00% | 5.00% | 5.00% | 5.00% | 5.00% | 5.00% |
| | MDA | — | — | 0.01% | 0.05% | 0.10% | 0.05% | 1.00% |
| | Surfynol 465 | 1.50% | 1.50% | 1.50% | 1.50% | 1.50% | 1.50% | 1.50% |
| | Proxel XL2 | 0.1% | 0.1% | 0.1% | 0.1% | 0.1% | 0.1% | 0.1% |
| Total | | 100% | 100% | 99.96% | 100% | 100% | 100% | 100% |
| Storage stability (60° C., 24 hours later) | Degree of viscosity | Δ | ○ | ○ | ○ | ○ | ○ | Δ |
| | Particle size | Δ | ○ | ○ | ○ | ○ | ○ | Δ |
| pH value | | ○ | ○ | ○ | ○ | ○ | Δ | Δ |
| Discharge stability (continuous discharge stability) | | X | Δ | ○ | ○ | ○ | ○ | ○ |

[Conclusion]

As shown in Table 2, the alcoholamine-containing ink compositions of the examples 1 to 5 all exhibited remarkably stable dischargeability. Adjustments of the MDA content further improved the storage stability, and the ink compositions with optimum pH values were successfully prepared.

INDUSTRIAL APPLICABILITY

The ink composition according to the invention is available for use in printing materials using an inkjet printer.

The invention claimed is:

1. An ink composition, comprising:
water; a disperse dye; glycols; and an alcoholamine, wherein
the alcoholamine is a methyldiethanolamine,
the methyldiethanolamine in a content equal to or greater than 0.01 wt. % and equal to or less than 1 wt. %,
the disperse dye is directly dispersed in a solvent,
the methyldiethanolamine is added to the ink composition so as to prevent the disperse dye from being aggregated.

2. The ink composition as claimed in claim 1, wherein a plurality of the disperse dyes is blended in the ink composition.

3. The ink composition as claimed in claim 2, wherein the plurality of the disperse dyes that are differently colored is blended in the ink composition to constitute a black ink.

4. The ink composition as claimed in claim 1, further comprising:
a surfactant.

5. The ink composition as claimed in claim 1, wherein the glycols in a content equal to or greater than 10 wt. % and equal to or less than 30 wt. %.

6. The ink composition as claimed in claim 5, wherein the disperse dye in a content equal to or greater than 0.5 wt. % and equal to or less than 10 wt. %.

7. The ink composition as claimed in claim 1, wherein the methyldiethanolamine in a content equal to or greater than 0.01 wt. % and equal to or less than 0.5 wt. %.

* * * * *